United States Patent Office 3,345,879
Patented Oct. 10, 1967

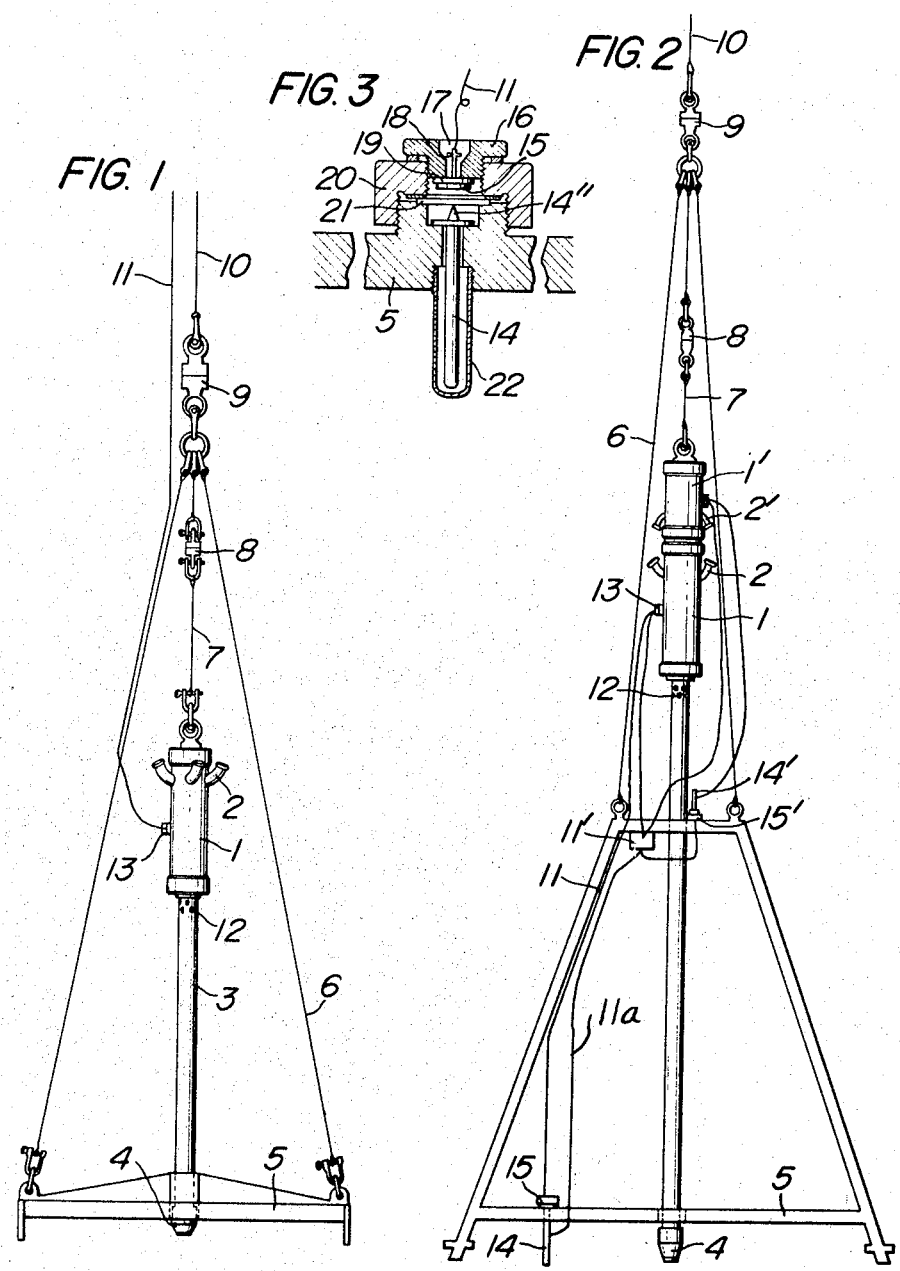

3,345,879
APPARATUS FOR EXTRACTING SAMPLES FROM THE BED OF A BODY OF WATER
Noriyuki Nasu, Tokyo, Hiroshi Yamazaki, Yokohama, and Hiroshi Shinozaki and Tadasu Yonekura, Oita-shi, Japan, assignors to Asahi Kasei Kogyo Kabushiki Kaisha, Osaka, and Tsurumi-Seiki Kosakusho Co., Ltd., Yokohama, Japan, both corporations of Japan
Filed Sept. 23, 1964, Ser. No. 398,679
Claims priority, application Japan, Sept. 27, 1963, 38/50,816
3 Claims. (Cl. 73—425.2)

This invention relates to apparatus for deep-sea bottom sampling which are designed to conveniently extract columnar samples of sediments from the sea bottom.

Previously, sampling operation in deep sea has been carried out either by a piston or a gravity corer for columnar sampling or by a dredger which scrapes the surface of the sea bottom, or by a specialized boring machine designed for full-scale boring.

None of these previous kinds of bottom samplers, however, have been satisfactory as they have defficiences even when used in the most advantageous manner.

One group of these samplers, including dredgers and piston and gravity corers, when used in a shallow or medium-deep sea close to a continent or an insland and having a sandy, silty or conglomerate bottom sediment, can take samples only to the depth of the order of from several centimeters to one meter, apart from the case of sampling an unusual soft muddy bottom, and, for exposed bottom rocks, is usually entirely unworkable.

Another group includes boring machines, which are in fact of the land type applied to the bottom sampling, are capable of deeper sampling than the first group but can operate only in the range of sea depths of up to 100 meters. The highest known record made in Japan is the sampling to the depth of one meter from the sea bottom, which was carried out in a 100-meter depth in the exploration work on the Aomori-Hakodate undersea tunnel project.

A further sampling system is the one which was used in the United States of America in April of 1961 on a part of the Mohole plan and included a specialized boring vessel, Cas No. 1, of 3000 tons. In this instance, boring to the depth of over 200 meters was performed at a sea depth of over 3000 meters. This system, however, involves cost reaching into astronomical figures and cannot be expected to be utilized with any practical success because of economical reasons particularly in cases where the sampling is intended for making profit.

To summarize, various types of deep-sea bottom samplers previously in use have all involved at least some of the following deficiencies: (1) small sampling depth; (2) limitation in the workable depth of water; and (3) enormous cost. Any of the previous devices has provided means for obtaining bottom samples at a depth of one meter to several ten meters, in a depth of water of 100 meters to 10,000 meters. Particularly, for sampling operation intended for some economical purpose as in the prospecting of undersea resources, no practical system has previously been available.

The present invention has for its object to provide apparatus for deep-sea bottom sampling which is operable to increased sampling depths in deeper water and at reduced cost as compared to any of previous deep-sea bottom samplers.

According to the present invention, a specialized rocket engine which produces a propelling force and a rotating torque is incorporated in a part of the ordinary bottom sampler thereby to eliminate the driving weight or the waterproof motor or piston previously used in the sampler and thus to reduce the entire weight and the manufacturing cost of the system while substantially improving the penetrating capacity of the core catcher tube, which according to the invention is subjected to the propulsion and the rotating torque of the rocket.

Namely, according to the present invention, a bottom sampler of the type including a core catcher tube, wire ropes and driving means comprises a single- or multiple-stage rocket fixed coaxially to the core catcher tube to produce a rotative torque and a downward propulsion or, together with such rocket, another single- or multiple-stage rocket also fixed coaxially to the core catcher tube to produce a rotating torque and an upward propulsion. Needless to say, this type of bottom sampler conventionally has included, as a driving means, a special weight or a vibrator, which is eliminated according to the present invention. According to the present invention, the downward rocket is designed to be ignited when the sampler is bottomed or brought close to the sea bottom to produce a rotating torque and a propelling force effective to cause the core catcher tube to penetrate into the sea bottom. Then, after an appropriate delay the reverse or upward rocket is ignited to withdraw the tube. Another feature of the present invention is the provision of a pressure-operated switch which is operable when the sampler is bottomed.

The present invention will now be described in further detail with reference to the accompanying drawing, which illustrates a few embodiments of the invention and in which:

FIG. 1 is a vertical elevation view of one form of bottom sampler embodying the present invention in which a rocket is mounted on the upper portion of the sampling tube to produce a downward propulsion and a rotating torque;

FIG. 2 is a view similar to FIG. 1 illustrating another form of bottom sampler embodying the present invention which includes an upward thrust rocket and a downward thrust rocket mounted on the upper portion of the sampling tube and a rocket ignition device; and FIG. 3 is a sectional view showing the switching structure of the ignition device in detail.

Referring to the drawings and first to FIG. 1, there is shown a bottom sampler comprising a support frame 5, a core catcher tube 3 slidably mounted in said frame and a wire 10 from which the entire assembly is suspended for being raised and lowered. A rocket engine 1 is fixed to the upper portion of the core catcher tube 3 and has inclined nozzles 2, which have each a nozzle seal applied thereon for water-sealing the nozzle until the rocket is actuated. Wires 6 hold the support frame in position. The core catcher tube 3 includes a tip portion 4 which functions as a check valve to prevent the columnar sample taken into the hollow portion of the tube from flowing out therefrom. Holes 12 are formed in the wall of the core catcher tube 3 to release water pressure developing therein when the tube is driven to take a bottom sample. A relatively fine wire 7 is used to directly hang the core catcher tube with the rocket engine mounted thereon and is designed to break when the rocket is operated. An ignition device 13 is provided for the rocket 1 and an ignition cable 11 is connected to the device 13. Two swivel joints 8 and 9 are utilized to accommodate any rotation of the entire assembly due to the strain of the wire ropes when the sampler is raised or lowered.

For sampling operation, the sampler, after it has been assembled as illustrated, is lowered overboard until it is seated at the sea bottom. Then, the rocket is ignited under remote control on board the ship. By doing so, the rocket engine 1 is started and ejects combustion gases through inclined nozzles 2 thereby producing an axially downward thrust or propulsion together with a rotating torque. Accordingly, the core catcher tube 3 carrying the rocket is forcefully propelled into the sea bottom, breaking the wire 7. After the tube comes to rest, the wire rope 10 is hauled up, for example, by a winch on board the ship to recover the core catcher tube 3 together with the rocket, the body of which is now engaged by the frame 5. It is preferred that smokeless powder of the double base type is used as a fuel for the rocket. Particular details of this sampler assembly are listed hereinafter.

Reference will next be made to FIG. 2, which illustrates a bottom sampler including two rockets mounted coaxially on the upper portion of the core catcher tube, one designed to produce a downward thrust and a rotating torque and the other designed to produce an upward thrust and a rotating torque. There is also illustrated a rocket ignition device automatically operable when the sampler is bottomed and having an ignition switch including electrodes disposed opposite each other with a rupture disc interposed therebetween.

In FIG. 2, forward and reverse rockets 1 and 1' include inclined nozzles 2 and 2', respectively, and are fixed one above the other at the upper portion of the core catcher tube 3, which is slidably carried in the support frame 5. The ignition device 3 includes ignition leads 11, a battery 11' and an ignition switch having conducting rods 14 and 15. Other reference numerals indicate parts corresponding to those indicated in FIG. 1 by like numerals.

For a sampling operation, the sampler, after it has been assembled as illustrated, is lowered overboard by means of wire rope 10 until the assembly is bottomed, in the same manner as described above with reference to FIG. 1. When the assembly is bottomed, the forward rocket is first ignited by the contacting of the conducting rods 14 and 15 (FIG. 3) to produce a downward thrust and a rotating torque effective to propel the core catcher tube 3 into the bottom sediment. Alternatively, the rocket may be ignited by on-board control as with the case of the first-described embodiment, by providing an ignition cable leading to the rocket. Subsequently, the reverse rocket is ignited either by on-board control or, as the core catcher tube is advanced, by the contacting of the ignition conducting rods 14' and 15' having a rupture disc interposed therebetween. When ignited, the reverse rocket produces an upward thrust and a rotating torque effective to withdraw the sampling tube from the sea bottom. In this example, conducting rods 14' and 15' are arranged in an opposite relation to that between conducting rods 14 and 15.

Referring to FIG. 3, which illustrates the automatic rocket ignition device operable when the sampler carrying it is bottomed, reference numeral 5 designates the support frame of the sampler on which the ignition device is mounted; 14 and 15 designate respective conducting rods; and 21 designates a rupture disc of appropriate breaking strength interposed between the two conducting rods normally to keep them from contacting each other. The conducting rod 15 is electrically insulated by insulators 17 and 19 and is also secured to the support frame 5 by means of clamping caps 16 and 20. This conducting rod 15 is connected with a priming powder through a member 18 and the ignition lead 11. On the other hand, the conducting rod 14, though not insulated in particular, will be connected to the conducting rod 15 by a separate ignition lead 11a through a battery and priming powder when the sampler is in use. The conducting rod 14 is housed in a protecting tube 22 so as to avoid inadvertent contact of said conducting rod with the conducting rod 15 during the preparation of the device. Reference numerals 14' and 15' designate conducting rods which are the same as the conducting rods 14 and 15 but are inverted, the other arrangement being the same as that shown in FIG. 3.

The conducting rod 14 is carried on or formed integral with a rod member projecting downwardly beyond the support frame 5. It is to be understood that clearance means is provided to introduce water pressure to that surface of the rupture disc 21 which is adjacent to the rod member when the sampler is in use.

In operation, the protecting tube 22 is removed to expose the conducting rod 14. When the sampler is lowered into the sea, the rupture disc 21 is subjected to water pressure and at the instant when the sampler is bottomed is ruptured by the pointed head 14" of conducting rod 14 under the entire weight of the sampler either to allow intrusion of water into the electrode region or to make contact with the conducting rod 15. The electrical resistance between the two conducting rods 14 and 15 is thus reduced to complete the ignition circuit. It is to be noted that the rupture disc 21 can be handled safely in the air though it is more sensitive to break under water than in air because of the water pressure to which the disc is subjected. The arrangement is such that, when the forward rocket 1 hits the conducting rod 14' shown in FIG. 2, upon actuation of the conducting rod 14, the conducting rod 14' is brought into contact with the conducting rod 15', thereby igniting the reverse rocket 1'.

The following table includes constructional details of the two embodiments and major parts thereof.

|  | First embodiment | Second embodiment |
| --- | --- | --- |
| Core catcher: | | |
| Diameter, mm | 70 | 100 |
| Length, mm | 1,250 | 2,500 |
| Weight of entire assembly, kg | 67 | 150 |
| Depth of water, m | 70 | 300 |
| Rocket engine: | | |
| Inner diameter, mm | 107 | 107 |
| Length, mm | 550 | 1,100+550 |
| Weight of propellant, kg | 3.7 | 7.0+3.5 |
| Internal pressure, kg./cm.² | 300 | 300 |
| Thrust, kg./cm. | 2,000 | 4,000+2,000 |
| Torque, kg | 2,000 | 4,000+2,000 |
| Burning time, sec | 0.3 | 0.4 |
| Rupture disc: | | |
| Thickness, mm | | ¹ 4 |
| Diameter, mm | | 30 |
| Sampling depth, mm | 1,000 | 2,500 |
| Kind of bottom | Sandy | Silty |

¹ Plastic plate.

Generally, a bottom sampler includes as major parts a core catcher tube, means for driving and extracting the core catcher tube, and means for recovering the core catcher tube and the driving and extracting means.

The present invention relates to improvements in or relating to the driving means or the driving and extracting means. In the embodiments illustrated, wire ropes are used as the extracting and recovering means, and a support frame is used as an appendage for helping the entire assembly stand upright. However, the present invention is not to be restricted to such details and, for example, a float device may be included as the extracting and recovering means.

It will be appreciated from the foregoing description that the bottom sampler according to the present invention has an astonishing penetration capacity compared with any of previous samplers and is markedly reduced in cost as well as in weight for its capacity so that it can conveniently be carried on board any ordinary observation ship for use in any considerable depth of water and thus is highly valuable for use in scientific research and industrial development of undersea resources.

Though a few embodiments of the invention have been described and shown herein, it is to be understood that the invention is not to be restricted to the details set forth but many changes and modifications can be made without departing from the scope and spirit of the invention as claimed.

What is claimed is:

1. A sample recovering device comprising a core receiving tube, means for driving said core tube including a rocket attached directly to said tube at the top thereof and concentric therewith, said rocket having nozzles facing geenrally upwardly so that when the rocket is ignited the tube is driven downwardly and enters a body from which a sample is to be removed, said nozzles being inclined with respect to the axis of the tube to produce rotation of the tube when it is driven downwardly, means for igniting said rocket, support means slidably receiving the core tube at the lower end thereof and engaging the rocket after the same has been ignited and the core tube has been lowered, and means for recovering the entire sampler assembly.

2. A device as claimed in claim 1 wherein said means for igniting said rocket comprises switch means for closing an electric circuit which controls the ignition of the rocket, said support means supporting the switch means beneath the rocket and remote therefrom so that the switch means contacts the surface of the body from which a sample is to be removed when the sample recovering device is lowered whereby the switch means is closed.

3. A sample recovering device comprising a core receiving tube, means for driving said core tube including a rocket attached directly ot said tube at the top thereof and concentric therewith, said rocket having nozzles facing generally upwardly so that when the rocket is ignited the tube is driven downwardly and enters a body from which a sample is to be removed, said nozzles being inclined with respect to the axis of the tube to produce rotation of the tube when it is driven downwardly, means for extracting said tube from said body from which the sample is to be removed, the latter means comprising a second rocket attached directly to the top of the first said rocket concentric therewith, said second rocket having nozzles facing generally downwardly so that when the second rocket is ignited the tube will be driven upwardly, the latter nozzles being inclined with respect to the axis of the tube to produce rotation of the tube when it is driven upwardly, means for igniting said rockets and means for recovering the entire sampler assembly.

References Cited
UNITED STATES PATENTS

| | | | |
|---|---|---|---|
| 2,340,738 | 2/1944 | Dilley | 175—100 |
| 2,443,687 | 1/1948 | Marquard | 200—61.04 |
| 2,665,885 | 1/1954 | Gignoux | 175—6 |
| 2,947,829 | 8/1960 | Fish | 200—61.08 |
| 3,155,174 | 11/1964 | Niskin | 175—4 |

RICHARD C. QUEISSER, *Primary Examiner.*

JAMES J. GILL, *Examiner.*

J. J. SMITH, J. W. MYRACLE, *Assistant Examiners.*